(12) United States Patent
Zhang et al.

(10) Patent No.: US 10,215,181 B2
(45) Date of Patent: Feb. 26, 2019

(54) VOLUTE CENTRIFUGAL FAN WITH PERMANENT-MAGNET BRUSH-LESS MOTOR SYSTEM

(71) Applicant: ZHE JIANG YILIDA VENTILATOR CO., LTD, Taizhou, Zhejiang (CN)

(72) Inventors: Qizhong Zhang, Zhejiang (CN); Wei Zhang, Zhejiang (CN)

(73) Assignee: Zhe Jiang Yilida Ventilator Co., Ltd, Zhejiang (CN)

( * ) Notice: Subject to any disclaimer, the term of this patent is extended or adjusted under 35 U.S.C. 154(b) by 0 days.

(21) Appl. No.: 15/579,107

(22) PCT Filed: Feb. 15, 2017

(86) PCT No.: PCT/CN2017/073595
§ 371 (c)(1),
(2) Date: Dec. 1, 2017

(87) PCT Pub. No.: WO2017/211093
PCT Pub. Date: Dec. 14, 2017

(65) Prior Publication Data
US 2018/0231010 A1 Aug. 16, 2018

(30) Foreign Application Priority Data
Sep. 28, 2016 (CN) .......................... 2016 1 0855252

(51) Int. Cl.
*F04D 25/08* (2006.01)
*H02K 5/18* (2006.01)
(Continued)

(52) U.S. Cl.
CPC ........... *F04D 25/082* (2013.01); *F04D 17/16* (2013.01); *F04D 25/068* (2013.01);
(Continued)

(58) Field of Classification Search
CPC .... F04D 25/08; F04D 25/082; F04D 29/5826; F04D 29/5806; F04D 29/441;
(Continued)

(56) References Cited

U.S. PATENT DOCUMENTS

| 2,703,199 A * | 3/1955 | Drake ................. F04D 29/4246 |
| | | 415/121.2 |
| 7,105,979 B1 | 9/2006 | Gabrys |
| 2010/0254826 A1* | 10/2010 | Streng ..................... F04D 25/06 |
| | | 417/44.1 |

FOREIGN PATENT DOCUMENTS

| CN | 204733056 | 10/2015 |
| CN | 105370593 | 3/2016 |

(Continued)

OTHER PUBLICATIONS

International Search Report and Written Opinion corresponding to International Patent Application No. PCT/CN2017/073595 dated Jun. 22, 2017.

*Primary Examiner* — Kenneth J Hansen
(74) *Attorney, Agent, or Firm* — Leason Ellis LLP

(57) ABSTRACT

A centrifugal fan with a permanent-magnet brush-less motor system is provided with a volute, an outer rotor motor installed in the volute through a bracket, and an impeller externally sleeved on the outer rotor motor and positioned in the volute. The impeller is connected with the outer rotor motor and consists of a volute board and side boards on two sides of the volute board. The volute board is formed with an opening at a part on the horizontal plane and a bridge arch-type radiator having radiating fins matched with the opening is installed at the opening. The centrifugal fan improves heat dissipation with load changes allowing the driver to operate at lower temperatures that improves oper- (Continued)

ating efficiency and service life. The larger the load, the better the heat dissipation effect of the driver.

6 Claims, 4 Drawing Sheets

(51) Int. Cl.
  *F04D 29/42* (2006.01)
  *F04D 29/44* (2006.01)
  *F04D 29/58* (2006.01)
  *F04D 17/16* (2006.01)
  *F04D 25/06* (2006.01)

(52) U.S. Cl.
  CPC ..... *F04D 29/4226* (2013.01); *F04D 29/4233* (2013.01); *F04D 29/441* (2013.01); *F04D 29/5806* (2013.01); *F04D 29/5813* (2013.01); *H02K 5/18* (2013.01); *F04D 29/5826* (2013.01)

(58) Field of Classification Search
  CPC ............... F04D 29/2433; F04D 29/424; F04D 29/4246; F24F 1/0022
  See application file for complete search history.

(56) References Cited

FOREIGN PATENT DOCUMENTS

| | | |
|---|---|---|
| CN | 106337824 | 1/2017 |
| EP | 1720235 | 11/2006 |
| EP | 1798421 | 6/2010 |
| JP | 2000152534 | 5/2000 |
| JP | 2006187075 | 7/2006 |
| JP | 2011091990 | 5/2011 |
| JP | 4705122 | 6/2011 |
| WO | 0227895 | 4/2002 |

\* cited by examiner

VOLUTE CENTRIFUGAL FAN WITH PERMANENT-MAGNET BRUSH-LESS MOTOR SYSTEM

BACKGROUND OF THE INVENTION

Technical Field

The present invention relates to a novel volute centrifugal fan with a permanent-magnet brush-less motor system.

Description of Related Art

A traditional volute centrifugal fan includes a volute fan and a permanent-magnet brush-less motor system for driving, wherein the permanent-magnet brush-less motor system is an integrated (a driver is integrated with a permanent-magnet motor) or a split-type permanent-magnet brush-less motor system. The split-type permanent-magnet brush-less motor system includes a permanent-magnet brush-less motor and a driver, wherein the heat dissipation of the driver is basically implemented through natural air, and such heat dissipation mode is low in heat dissipation efficiency. In particular, the driver is running at a high temperature when the centrifugal fan bears a large air volume and a large pressure, directly affecting the service life and efficiency of the driver.

Along with the rise in the energy efficiency and to facilitate the use by the customers, the integrated volute centrifugal fan with a permanent-magnet brush-less motor system "which is conveniently installed and plugged in to use, works efficiently and saves energy" has become an urgent need in the ventilation and cooling industry. Under the condition of the same volume, the volute centrifugal fan obtains the maximum air volume output, generates the maximum pressure, achieves the maximum efficiency, and generates the lowest noise, and when driving the same volute centrifugal fan, the motor is minimum-sized, and achieves the maximum output power and efficiency. In this way, the motor of the permanent-magnet brush-less motor system is minimized in size, but the driver is added. If the driver and the permanent-magnet motor are used as a whole piece, the volume of the permanent-magnet brush-less motor system is also increased, directly affecting the performance of the volute centrifugal fan. In order to reduce the size of the permanent-magnet brush-less motor system, the driver is usually separated and placed on the outer surface of the volute fan. However, such solution affects the dimensions of the fan, affects the installation and use by customers, and brings troubles during installation. Meanwhile, the separated driver also dissipates heat through natural heat dissipation. Such low-efficiency heat dissipation mode can reduce the operation efficiency of and shorten the service life of the driver, and reduce the overall efficiency of and shorten the service life of the volute centrifugal fan with the permanent-magnet brush-less motor system.

BRIEF SUMMARY OF THE INVENTION

The technical problem to be solved by the present invention is to provide a novel volute centrifugal fan with a permanent-magnet brush-less motor system, which can change the heat dissipation effect according to the changes of the load of the centrifugal fan. The larger the load is, the better the heat dissipation effect a driver has. The present invention ensures that the driver runs at a low temperature, improves the operating efficiency of the driver, and prolongs the service life of the driver.

The technical solution adopted by the present invention to solve the above mentioned problems is as follows:

The present invention discloses a novel volute centrifugal fan with a permanent-magnet brush-less motor system, including a volute, an outer rotor motor installed in the volute through a bracket and an impeller externally sleeved on the outer rotor motor; the impeller is positioned in the volute; the impeller is connected with the outer rotor motor; the volute consists of a volute board and side boards on two sides of the volute board; each one of the side boards on two sides is formed with an air inlet; the volute is formed with an air outlet on one side, characterized in that on a horizontal plane which centers on the air outlet, the volute board is formed with an opening at a part on the horizontal plane; a bridge arch-type radiator matched with the opening is installed at the position of the opening; radiating ribs of the bridge arch-type radiator are sunk into an air duct formed between the volute and the impeller via the opening; the bridge arch-type radiator is in close fit with the surface of the volute board; the bridge arch-type radiator is installed with a driver matched with the outer rotor motor, the opening is internally provided with fixed ribs which are distributed uniformly, and positioning holes are formed among the fixed ribs; the volute and the impeller form the air duct therebetween; the bridge arch-type radiator includes a plurality of radiating rib groups which are disposed at the lower surface thereof; the radiating rib groups pass through the matched positioning holes and are positioned in the air duct; the radiating rib groups consist of a plurality of uniformly distributed radiating ribs; the arc radius of each one of the radiating ribs is greater than the arc radius of the position, where the driver is installed, of the volute board after the volute is molded; radiating air channels are formed among the radiating ribs; and the radiating air channels and the air outlet are consistent in the air outflow direction.

The number of the fixed ribs is 1-19; the width of the fixed ribs is 1-10 mm; the number of the positioning holes is 2-20; and the width of the positioning holes is smaller than 12 mm.

The interval between the radiating rib groups is equal to or greater than the width of each one of the fixed ribs; the width of each one of the radiating rib groups itself is equal to or smaller than the width of each one of the positioning holes; the radiating ribs are concentric circle-shaped bosses formed by downward protrusions of the surface of the bridge arch-type radiator contacting the volute board; the radius of the concentric circle is greater than the radius of the part of the volute board, equipped with the bridge arch radiator, after the volute is molded; the radiating ribs protrude downward at the lower surface of the bridge arch-type radiator; and the protruding height of the radiating ribs is 1-5 mm.

The bridge arch-type radiator is assembled with the surface of the volute board in a sealing way through sealant or a sealing washer.

The area of the bridge arch-type radiator is greater than the area of the opening.

The extensions of the front and rear sides of the volute board, the right tangent face of the volute board and the extension of the upper face of the volute board embrace a limiting space, and the driver is positioned in the limiting space.

The present invention has the following beneficial effects:

Compared with the prior art, when the novel volute centrifugal fan with the permanent-magnet brush-less motor system that adopts the structure of the present invention is running, the external air enters via the air inlets on two sides of the volute board, and an air duct is formed between the impeller and the inner wall of the volute. Driven by the rotation of the impeller, the air in the air inlets flows out via the air outlet along the trajectory of the air duct. The radiating air channels formed among the radiating ribs and the outflow of air at the air outlet are consistent in flow direction, so the radiating ribs in the air duct do not block the flow of the air and disturb the flow trajectory of the air. On the contrary, the distribution direction of the radiating air channels and the air duct of the air are consistent in the direction, so the air can very smoothly flow along the trajectory of the radiating air channels, and finally exit via the air outlet, without affecting the performance of the fan and generating noises. When passing through the radiating air channels, the air brings the heat on the radiating ribs away, thus achieving the radiating effect and making an effective use of the air resource. Meanwhile, as the air volume and the pressure in the centrifugal fan increase, the power of the permanent-magnet brush-less motor system which drives the fan also increases, and the heat dissipation also needs speeding up. Due to the increase in the air volume and the air speed, the novel volute centrifugal fan with the permanent-magnet brush-less motor system is also improved in radiation efficiency, and the driver is in the low-temperature running state. Such heat dissipation mode not only does not additionally need other radiation equipment, but also can avoid increasing the production cost of the volute centrifugal fan and the volume of the volute centrifugal fan, and can also improve the radiation efficiency of the driver to the maximum extent, thus enhancing the operating efficiency of the bridge arch-type radiator, prolonging the service life of the driver and prolonging the service life of the volute centrifugal fan.

DETAILED DESCRIPTION OF THE INVENTION

The present invention is described in further detail with reference to the attached drawings and embodiment.

Figure 1:
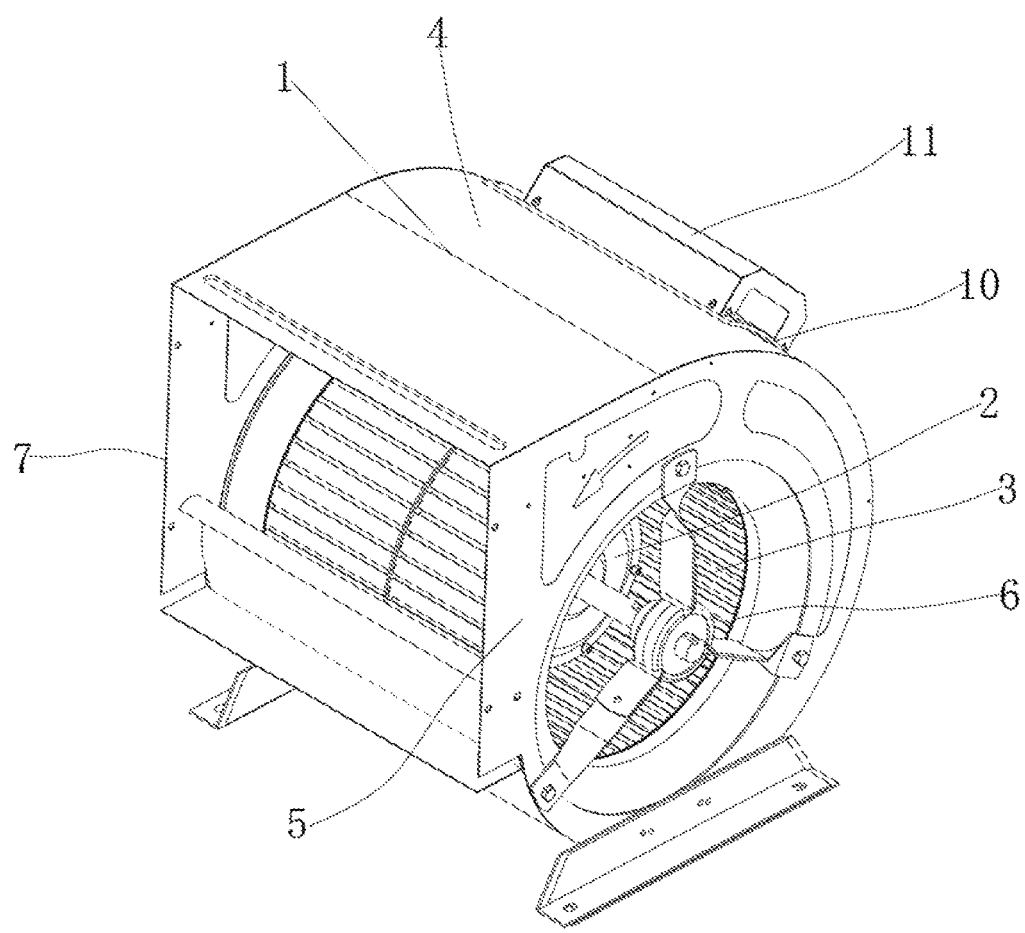
FIG. 1 is a structural view of a novel volute centrifugal fan with a permanent-magnet brush-less motor system of the present invention viewed at one angle.
Figure 2:
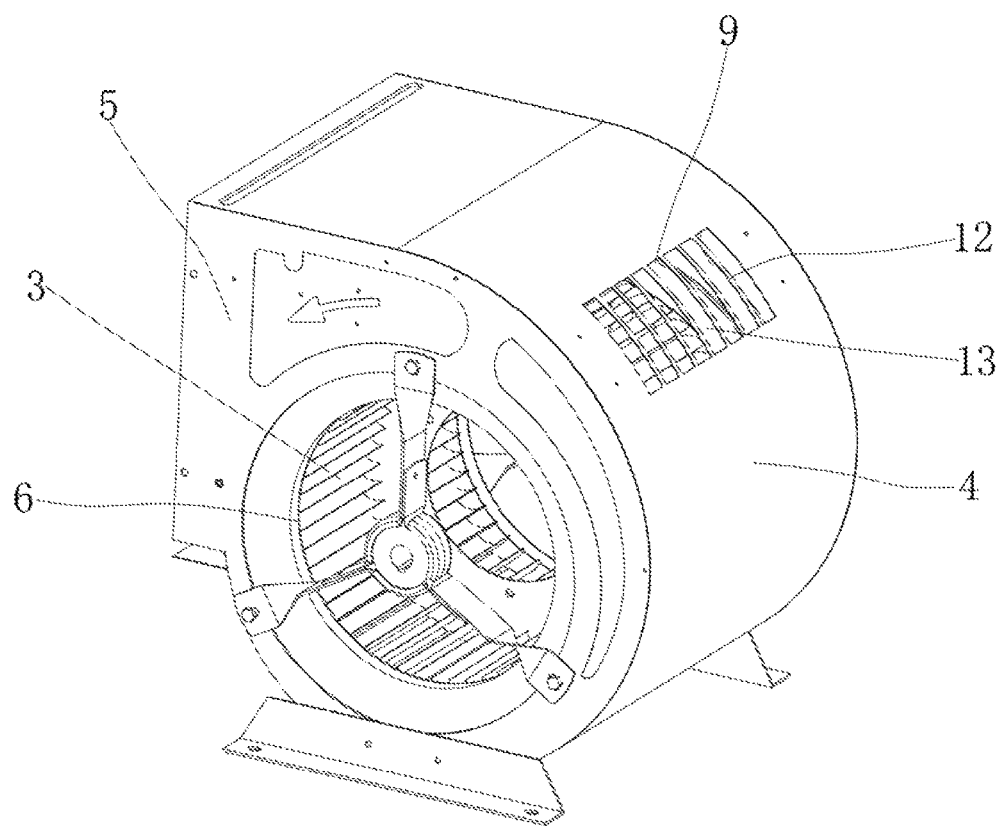
FIG. 2 is a structural view of the novel volute centrifugal fan with a permanent-magnet brush-less motor system of the present invention viewed at another angle.
Figure 3:
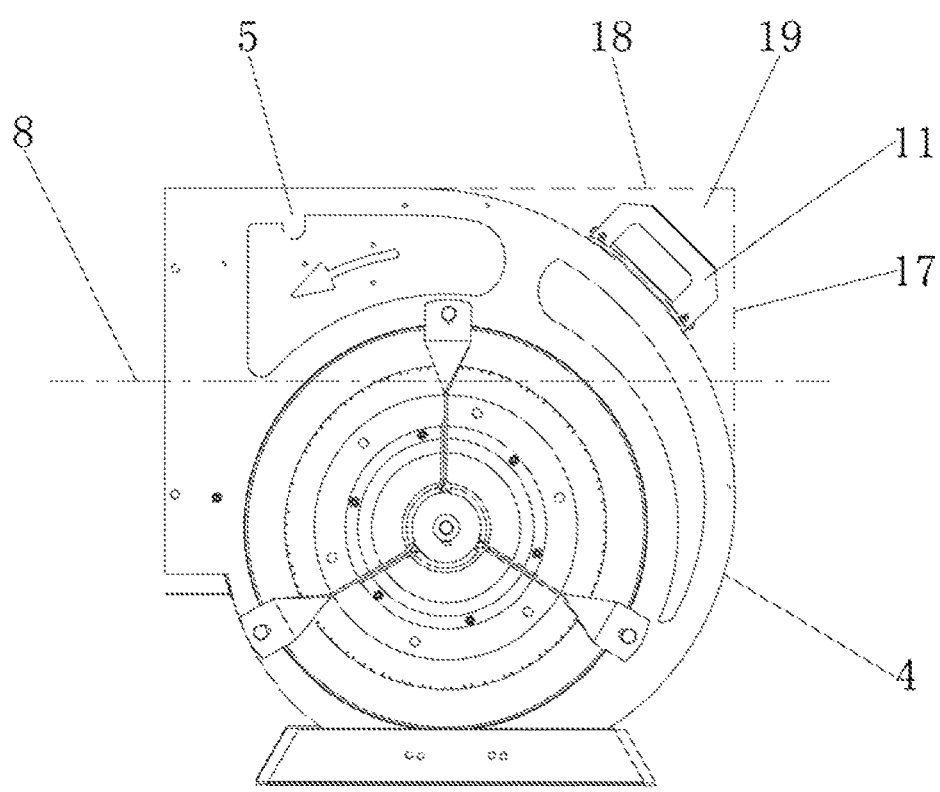
FIG. 3 is a lateral view of the novel volute centrifugal fan with a permanent-magnet brush-less motor system of the present invention.
Figure 4:
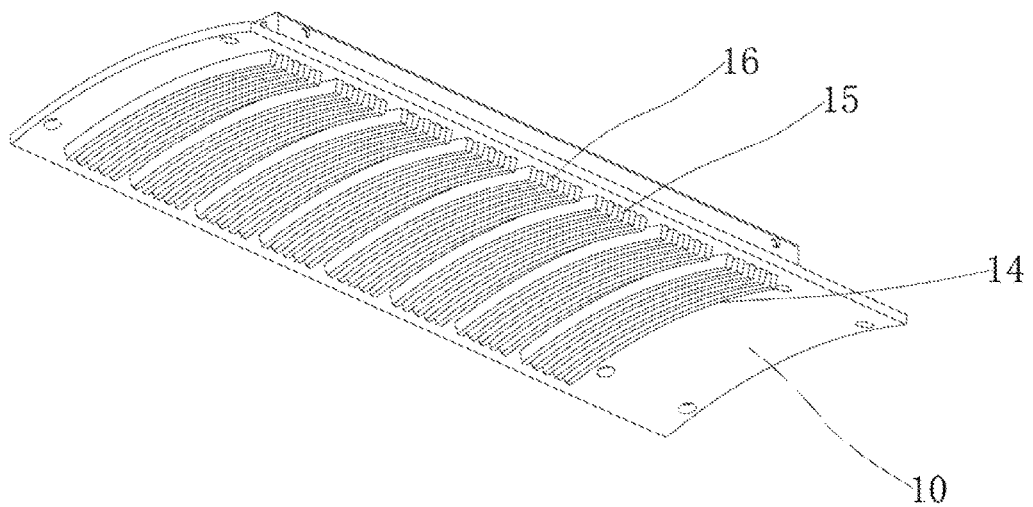
FIG. 4 is a structural view of the bridge arch-type radiator.

Refer to FIG. 1-FIG. 4. The present invention provides a novel volute centrifugal fan with a permanent-magnet brushless motor system, including a volute 1, an outer rotor motor 2 erected in the volute 1 and an impeller 3 externally sleeved on the outer rotor motor 2. The impeller 3 is positioned in the volute 1. The impeller 3 is connected with the outer rotor motor 2. The volute 1 consists of a volute board 4 and side boards 5 on two sides of the volute board. Each one of the side boards 5 on two sides is formed with an air inlet 6. The volute 1 is formed with an air outlet 7 on one side. On a horizontal plane 8 which centers on the air outlet 7, the volute board 4 is formed with an opening 9 at a part on the horizontal plane 8. A bridge arch-type radiator 10 matched with the opening 9 is installed at the position of the opening 9, and the bridge arch-type radiator 10 is in close fit with the surface of the volute board 4. The bridge arch-type radiator 10 is installed with a driver 11 matched with the outer rotor motor 2. The opening 9 is internally provided with fixed ribs 12 which are distributed uniformly, and positioning holes 13 are formed among the fixed ribs 12. The volute and the impeller form an air duct there-between. The bridge arch-type radiator 10 includes a plurality of radiating rib groups 14 which are disposed at the lower surface thereof. The radiating rib groups 14 pass through the matched positioning holes 13 and are positioned in the air duct 1. The radiating rib groups 14 consist of a plurality of uniformly distributed radiating ribs 15. The are radius of each one of the radiating ribs 15 is greater than the arc radius of the position, where the driver is installed, of the volute board 4 of the molded volute. Radiating air channels 16 are formed among the radiating ribs 15. The radiating air channels 16 and the air outlet 7 are consistent in the air outflow direction.

The number of the fixed ribs 12 is 1-19; the width of the fixed ribs 12 is 1-10 mm; the number of the positioning holes 13 is 2-20; and the width of the positioning holes 13 is smaller than 12 mm.

The interval between the radiating rib groups 14 is equal to or greater than the width of each one of the fixed ribs 12; the width of each one of the radiating rib groups 14 itself is equal to or smaller than the width of each one of the positioning holes 13; the radiating ribs 15 are concentric circle-shaped bosses formed by downward protruding of the surface, contacting the volute board, of the bridge arch-type radiator; the radius of the concentric circle is greater than the radius of the part, equipped with the bridge arch radiator 10, of the volute board 4; the radiating ribs 15 protrude downward at the position of the lower surface of the bridge arch-type radiator 10; and the protruding height of the radiating ribs 15 is 1-5 mm.

The bridge arch-type radiator 10 is assembled with the surface of the volute board 4 in a sealing way through sealant or a sealing washer.

The area of the bridge arch-type radiator 10 is greater than the area of the opening 9.

The extensions of the front and rear sides of the volute board 4, the right tangent face 17 of the volute board 4 and the extension 18 of the upper face of the volute board 4 embrace a limiting space 19, and the driver 11 is positioned in the limiting space 19.

Usage of the present invention is as follows:

When the volute centrifugal fan is powered on, the outer rotor motor 2 starts running, and the impeller 3 rotates as well. The external air enters via the air inlets 6 on two sides of the volute board 4, and an air duct is formed between the impeller 3 and the inner wall of the volute 1. Driven by the rotation of the impeller 3, the air in the air inlets 6 flows out via the air outlet 7 along the air duct. Such process is repeated. Then, the external air is continuously imported via the air inlets 6 and discharged via the air outlet 7. The air duct always has air flowing. The radiating rib groups 14 in the volute 1 are also positioned in the air duct at this time.

The heat generated when the driver 11 is running is directly transmitted to the bridge arch-type radiator 10 which is connected with the driver 11. The heat is finally completely transmitted to the radiating rib groups 14, and then specifically distributed to the radiating ribs 15. The radiating air channels 16 formed among the radiating ribs 15 and the outflow of air at the air outlet 7 are consistent in flow direction, so the radiating ribs 15 in the air duct do not block the flow of the air and disturb the flow trajectory of the air.

On the contrary, the distribution direction of the radiating air channels 16 and the air duct of the air are consistent in the direction, so the air can very smoothly flow along the trajectory of the radiating air channels 16, and finally exit via the air outlet 7. Besides, the radiating ribs 15 are concentric circle shaped bosses formed by downward protrusions of the surface of the bridge arch-type radiator contacting the volute board, and the radius of the concentric circle is greater than the radius of the part of the volute board 4, equipped with the bridge arch radiator 10, so the air flowing over the lower surfaces of the radiating ribs 15 can smoothly flow toward the air outlet 7 under the guide of the radian without affecting the normal flow of the air in the volute centrifugal fan. When passing through the radiating air channels 16, the air flow brings the heat on the radiating ribs 15 away, thus achieving the radiating effect and making an effective use of the air resource. As the air volume and the pressure in the centrifugal fan increase, the novel volute centrifugal fan with the permanent-magnet brush-less motor system is also improved in heat dissipation efficiency, and the driver is in the low-temperature running state. Such heat dissipation mode not only does not additionally need other radiation equipment, but also can reduce the cost of the driver component and the area of the radiator and avoid increasing the production cost of the volute centrifugal fan and the volume of the volute centrifugal fan, and can also improve the radiation efficiency of the driver 11 to the maximum extent, thus enhancing the operating efficiency of the bridge arch-type radiator 10, prolonging the service life of the driver 11 and prolonging the service life of the volute centrifugal fan. On the basis of the natural heat dissipation, radiating heat using the air flow generated by the volute centrifugal fan can enhance the radiating efficiency by over two times and reduce the temperature rise by 50%.

The number of the fixed ribs 12 is 1-19; the width of each one of the fixed ribs 12 is 1-10 mm; the number of the positioning holes 13 is 2-20; and the width of each one of the positioning holes 13 is smaller than 12 mm. Such configuration can prevent deformation of the volute 1 caused by excessive area of the opening 9. The fixed ribs 12 can achieve an effect of strengthening the area strength of the opening 9, preventing the volute 1 from deforming and ensuring the stability of the volute centrifugal fan structure. Moreover, by such configuration, changing the manufacturing process of the volute centrifugal fan for the purpose of preventing the volute from deforming is not needed, thus reducing trouble.

The interval between the radiating rib groups 14 is equal to or greater than the width of each one of the fixed ribs 12, and the width of each one of the radiating rib group 14 itself is equal to or smaller than the width of each one of the positioning holes 13, thus ensuring that the radiating rib groups 14 can effectively pass through the positioning holes 13 and be positioned in the air duct. Besides, the radiating ribs 15 protrude downward at the position of the lower surface of the bridge arch-type radiator 10, and the protruding height of the radiating ribs 15 is 1-5 mm. The radiating ribs 15 in such protruding height scope can weaken their effects on the normal flow of the air to the maximum extent, ensuring that the volute centrifugal fan can run normally when the radiating ribs 15 are positioned in the air duct. Moreover, the radiating ribs 15 are concentric circle-shaped bosses formed by downward protrusions of the surface, contacting the volute board, of the bridge arch-type radiator, and the radius of the concentric circle is greater than the radius of the part, equipped with the bridge arch radiator 10, of the volute board 4, thus reducing the effects of the radiating ribs 15 on the volute centrifugal fan to the maximum extent.

The bridge arch-type radiator 10 is assembled with the surface of the volute board 4 in a sealing way through sealant or a sealing washer, ensuring that the air in the volute centrifugal fan does not leak via the positioning holes and ensuring the efficiency of the volute centrifugal fan. Besides, the area of the bridge arch-type radiator 10 is greater than the area of the opening 9, capable of further improving the air-tightness between the bridge arch-type radiator 10 and the volute board 4.

The extensions of the front and rear sides of the volute board 4, the right tangent face 17 of the volute board 4 and the extension 18 of the upper face of the volute board 4 embrace a limiting space 19, and the driver 11 is positioned in the limiting space 19. Therefore, the driver 11 is installed outside, but does not affect the overall dimensions of the volute centrifugal fan and not affect the installation of the volute centrifugal fan.

What is claimed is:

1. A volute centrifugal fan with a permanent-magnet brush-less motor system, comprising a volute, an outer rotor motor installed in the volute through a bracket and an impeller externally sleeved on the outer rotor motor; the impeller is positioned in the volute; the impeller is connected with the outer rotor motor; the volute consists of a volute board and side boards on two sides of the volute board; each one of the side boards on both sides is formed with an air inlet; the volute is formed with an air outlet on one side, characterized in that, the volute board has an opening positioned above a horizontal plane defined by a center of the air outlet; a bridge arch-type radiator is positioned matched with the opening; radiating fins of the bridge arch-type radiator are sunk into an air duct formed between the volute and the impeller via the opening; the bridge arch-type radiator is in contact with a surface of the volute board; the bridge arch-type radiator is installed with a driver matched with the outer rotor motor; the opening is internally provided with fixed ribs which are distributed uniformly, and positioning holes are formed among the fixed ribs; the volute and the impeller forming the air duct there-between; the bridge arch-type radiator includes a plurality of radiating rib groups disposed at a lower surface thereof; the radiating rib groups pass through the positioning holes and are positioned in the air duct; the radiating rib groups consist of a plurality of uniformly distributed radiating ribs; an arc radius of each one of the radiating ribs is greater than an arc radius of a part of the volute board where the driver is installed, after the volute is molded; radiating air channels are formed among the radiating ribs; and the radiating air channels and the air outlet are consistent in an air outflow direction.

2. The volute centrifugal fan with a permanent-magnet brush-less motor system according to claim 1, comprising 1-19 of the fixed ribs and 2-20 of the positioning holes; each fixed rib having a width of 1-10 mm.

3. The volute centrifugal fan with a permanent-magnet brush-less motor system according to claim 1, characterized in that an interval between the radiating rib groups is equal to or greater than a width of the fixed rib; each one of the radiating rib groups having a width equal to or smaller than the width of the positioning hole; each of the radiating ribs are concentric circle-shaped bosses formed by downward protrusions of a surface of the bridge arch-type radiator contacting the volute board; the concentric circle-shaped bosses having a radius greater than a radius of the part of a volute board equipped with the bridge arch-type radiator after the volute is molded; each of the radiating ribs protrude downward at a lower surface of the bridge arch-type radiator; the radiating ribs having a protruding height of 1-5 mm.

4. The volute centrifugal fan with a permanent-magnet brush-less motor system according to claim 1, characterized in that the bridge arch-type radiator is assembled with a surface of the volute board with sealant or a sealing washer.

5. The volute centrifugal fan with a permanent-magnet brush-less motor system according to claim 1, characterized in that the bridge arch-type radiator has an area greater than an area of the opening.

6. The volute centrifugal fan with a permanent-magnet brush-less motor system according to claim 1, wherein a limiting space is defined by: (i) extensions of front and rear sides of the volute board, (ii) a right tangent face of the volute board, and (iii) an extension of an upper face of the volute board, and wherein the driver is positioned in the limiting space.

\* \* \* \* \*